US011606129B1

(12) United States Patent
Kanno et al.

(10) Patent No.: US 11,606,129 B1
(45) Date of Patent: Mar. 14, 2023

(54) SYSTEMS AND METHODS FOR MULTIUSER DETECTION IN DISTRIBUTED ANTENNA SYSTEMS

(71) Applicants: KDDI Research, Inc., Fujimino (JP); University of Southern California, Los Angeles, CA (US)

(72) Inventors: Issei Kanno, Fujimino (JP); Takeo Ohseki, Fujimino (JP); Andreas Molisch, Los Angeles, CA (US)

(73) Assignees: University of Southern California, Los Angeles, CA (US); KDDI Research, Inc., Fujimino (JP)

( * ) Notice: Subject to any disclaimer, the term of this patent is extended or adjusted under 35 U.S.C. 154(b) by 0 days.

(21) Appl. No.: 17/675,185

(22) Filed: Feb. 18, 2022

(51) Int. Cl.
*H04B 7/06* (2006.01)
*H04B 7/0426* (2017.01)
*H04W 48/16* (2009.01)
*H04B 7/0456* (2017.01)
*H04L 1/00* (2006.01)

(52) U.S. Cl.
CPC ......... *H04B 7/0632* (2013.01); *H04B 7/0426* (2013.01); *H04B 7/0456* (2013.01); *H04W 48/16* (2013.01); *H04L 1/0003* (2013.01)

(58) Field of Classification Search
CPC .. H04B 7/0632; H04B 7/0426; H04B 7/0452; H04L 1/0003
USPC ....................................................... 375/267
See application file for complete search history.

(56) References Cited

U.S. PATENT DOCUMENTS 10,230,436 B2 * 3/2019 Liang .................. H04W 72/042

* cited by examiner

*Primary Examiner* — Leila Malek
(74) *Attorney, Agent, or Firm* — Foley & Lardner LLP

(57) ABSTRACT

The present embodiments relate to multi user detection in distributed antenna systems. A communication system may include a central processing circuitry and a plurality of access points connected to the central processing circuitry via a fronthaul interface. Each access point of the plurality of access points may include a plurality of antennas configured to receive signals from a plurality of UEs, and a local processing circuitry connected to the plurality of antennas. The local processing circuitry may be configured to estimate channel properties of a MIMO channel between the UEs and the antennas of the access point, and determine a subset of the UEs using the channel properties. The local processing circuitry may transmit data associated with the subset of wireless communication devices to the central processing circuitry for use to perform multiuser detection at the central processing circuitry.

26 Claims, 6 Drawing Sheets

SYSTEMS AND METHODS FOR MULTIUSER DETECTION IN DISTRIBUTED ANTENNA SYSTEMS

TECHNICAL FIELD

The present disclosure relates generally to communication devices, including but not limited to methods, apparatuses and systems for multiuser detection in distributed antenna systems.

BACKGROUND

Distributed antenna systems and multi-input multi-output (MIMO) channels becoming more common in communication systems such as $5^{th}$ generation (5G) wireless communication systems. The MIMO channels introduce redundancy in received data, which can be used to enhance multi-user data detection. However, such benefit comes with increased computational complexity and increased data load over communication interfaces between different components of a distributed antenna system.

SUMMARY

The present embodiments relate to multiuser detection in distributed antenna systems. In one embodiment, a communication system may include a central processing circuitry and a plurality of access points connected to the central processing circuitry via a fronthaul interface. Each access point of the plurality of access points may include a plurality of antennas configured to receive signals from a plurality of wireless communication devices, and a local processing circuitry connected to the plurality of antennas. The local processing circuitry may be configured to estimate, for each communication channel between an antenna of the plurality of antennas and a wireless communication device of the plurality of wireless communication devices, channel characteristics of the communication channel. The local processing circuitry may determine a subset of the plurality of wireless communication devices using channel characteristics for communication channels between the plurality of wireless communication devices and the plurality of antennas. The subset may include a number of wireless communication devices less than or equal to the number of antennas of the plurality of antennas. The local processing circuitry may transmit, to the central processing circuitry, data associated with the subset of wireless communication devices. The central processing circuitry may be configured to detect, for each wireless communication device of the plurality of wireless communication devices, a signal transmitted by the wireless communication device using data received from local processing circuitries of the plurality of access points.

In another embodiment, a method of multiuser detection in distributed antenna systems may include receiving, by each access point of a plurality of access points, a corresponding plurality of signals from a plurality of wireless communication devices via a corresponding plurality of antennas of the access point. The method may include estimating, by each access point of the plurality of access points and for each communication channel between an antenna of the corresponding plurality of antennas and a wireless communication device of the plurality of wireless communication devices, channel characteristics of the communication channel. The method may include determining, by each access point of the plurality of access points, a subset of the plurality of wireless communication devices using channel characteristics for communication channels between the plurality of wireless communication devices and the plurality of antennas. The subset may include a number of wireless communication devices less than or equal to a number of antennas of the access point. The method may include transmitting, by each access point of the plurality of access points to a central processing circuitry connected to the plurality of access points via a fronthaul interface, data associated with the subset of wireless communication devices. The method may include detecting, by the central processing circuitry, for each wireless communication device of the plurality of wireless communication devices, a signal transmitted by the wireless communication device using data received from the plurality of access points.

In another embodiment, an access point may include a plurality of antennas configured to receive signals from a plurality of wireless communication devices, and a local processing circuitry connected to the plurality of antennas. The local processing circuitry may estimate, for each communication channel between an antenna of the plurality of antennas and a wireless communication device of the plurality of wireless communication devices, channel characteristics of the communication channel. The local processing circuitry may determine a subset of the plurality of wireless communication devices using channel characteristics for communication channels between the plurality of wireless communication devices and the plurality of antennas. The subset may include a number of wireless communication devices less than or equal to the number of antennas of the plurality of antennas. The local processing circuitry may transmit, to a central processing circuitry connected to the local processing circuitry via a fronthaul interface, data associated with the subset of wireless communication devices for use to detect signals transmitted by the plurality of wireless communication devices.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Figure 1:
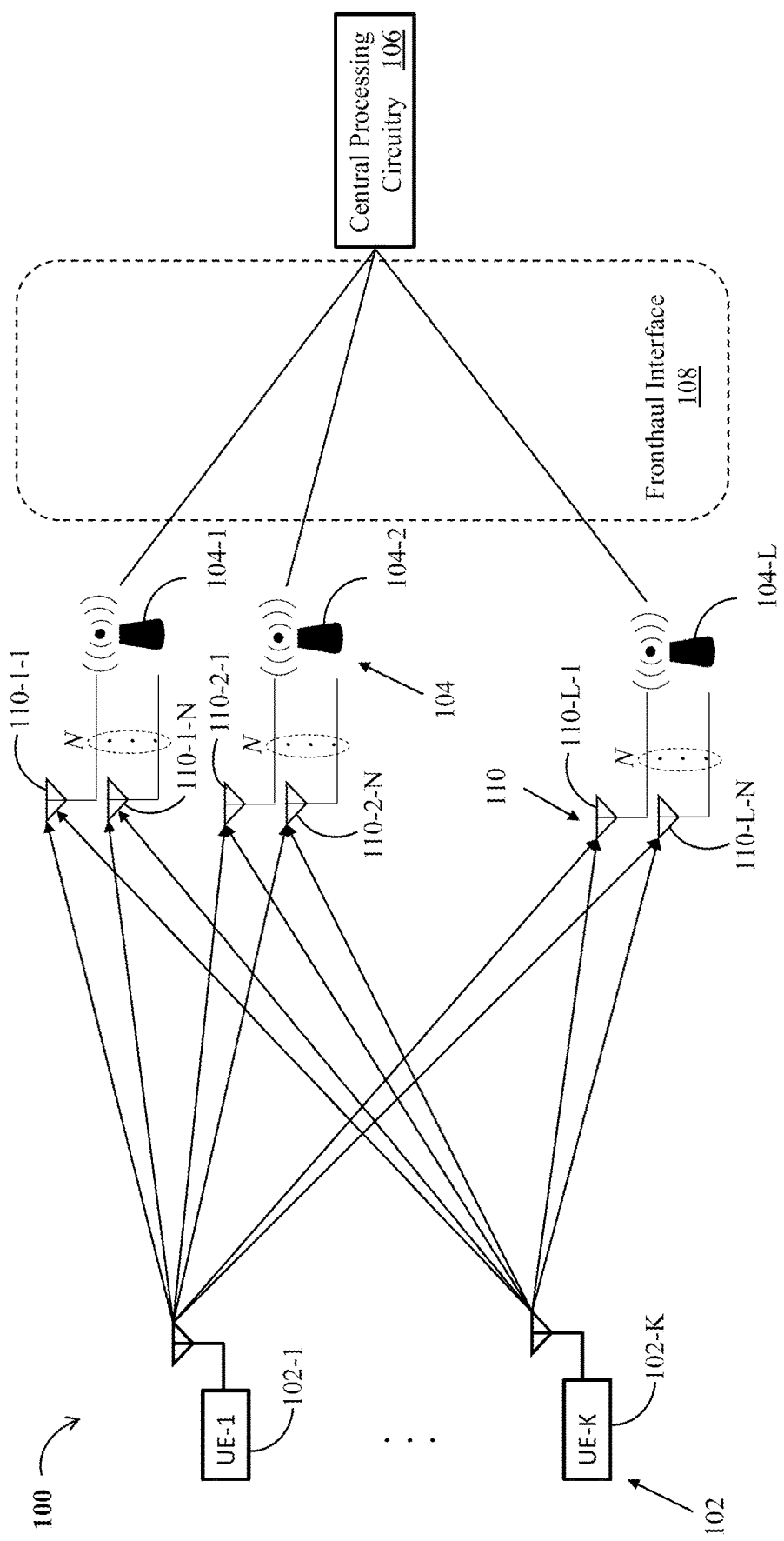
FIG. 1 shows a diagram of an example multi-input multi-output (MIMO) communication system, according to present embodiments.

Referring to FIG. 1, a diagram illustrating an example multi-input multi-output (MIMO) communication system 100 is shown, according to present embodiments. In brief overview, the MIMO communication system 100 can include a plurality of wireless communication devices or user equipments (UEs) 102-1 to 102-K, a plurality of access points 104-1 to 104-L and a central processing circuitry (or central processing unit) 106. The wireless communication devices or UEs 102-1 to 102-K are also referred to hereinafter, either individually or collectively, as wireless communication(s) device or UE(s) 102. The access points 104-1 to 104-L are referred to hereinafter, either individually or collectively, as access point(s) 104. The access points 104 can be connected to the central processing circuitry 106 via a fronthaul interface 108. Each access point 104-1 can include a plurality of antennas 110-1-1 to 110-1-N, which are also referred to hereinafter either individually or collectively as antenna(s) 108. The indices K, L and N are integers that represent the total number of UEs 102, the total number of access points 104 and the total number of antennas 104 per access point 104, respectively.

The UE 102 can include a mobile device, a smart phone, a tablet device, a smart watch, a vehicle communication device or any other type of communication device capable of communicating wirelessly with the access points 104. While FIG. 1 shows each UE 102 as having a single antenna, in general the UE 102 can include one or more antennas for transmitting and/or receiving signals. When transmitting signals, the UEs 102 can employ communication protocols or standards known or will be known in the future to a person skilled in the relevant art. The UEs 102 can transmit signals to communicate with other UEs 102 or with a remote server (not shown in FIG. 1) via the access points 104. The signals transmitted by the UEs 102 can include control plane signals or messages or user plane signals or messages.

The access points 104 (also referred to as access point devices, wireless access points or wireless access point devices) can include devices that allow the UEs 102 to connect to a broadband network. The access points 104 can be geographically distributed. For example, the access points 104 can be distributed over one or more cells of a cellular network. Each access point can include a plurality of antennas 110 for receiving radio signals from the UEs 102 and/or transmitting the radio signals to the UEs 102. Each antenna 110 can receive radio signals from multiple UEs 102 over multiple communication channels depending, for example, on how close the UEs 102 are to the respective access point 104 and/or the orientation of the antenna 110. The wireless connection between each UE-antenna pair can be viewed as a separate communication channel (or separate wireless communication channel). The various communication channels between the UEs 102 and the antennas 110 of various access points 104 can be viewed as a multi-input multi-output propagation channel. A radio signal received by a given antenna 110 can be a cumulative sum of multiple radio signals transmitted by multiple UE 102 over multiple communication channels between the antenna 110 and the UEs 102. The use of a plurality of antennas 110 in each access point (or at least in some of the access points) allows for redundancy. For instance, a radio signal transmitted by a given UE 102 can be received by a plurality of antennas 110 associated with a single access point 104 and/or multiple access points 104. The reception redundancy allows for more reliable detection of separate signals transmitted by separate UEs 102.

The fronthaul interface 108 can include a wired communication interface connecting the access points to the central processing circuitry 106. The central processing circuitry 106 can include any combination of one or more microprocessors, one or more digital signal processors (DSPs), one or more field-programmable gate arrays (FPGAs), one or more multicore processors, one or more network processors, other programmable software devices, or one or more integrated circuits (ICs). The central processing circuitry 106 can include a memory (not shown in FIG. 1) to store computer code instructions executable by a processor of the central processing circuitry 106 and/or data received from the access points 104. The memory can include cache memory, random access memory (RAM), read-only memory (ROM) or other types of memory devices. The central processing circuitry 106 can be configured to perform multi-user detection.

Each access point 104 can forward data received from the UEs 102 over the fronthaul interface 108 to the central processing circuitry 106 for multi-user detection. Specifically, each access point 104 can transmit the baseband I/Q (e.g., real and imaginary components of the complex-valued baseband signal) data received by each antenna 110 to the data processing circuitry 106 via the fronthaul interface 108. The central processing circuitry 106 can receive from each access point 104 the I/Q baseband data obtained by each antenna 110 of the access point 104, which puts a significant communication load over the fronthaul interface 108, especially for a large scale distributed antenna system. In other words, as the number of UEs 102, the number of access points 104 and/or the number of antennas 110 per access point 104 increase, the amount of baseband data transmitted over the fronthaul interface 108 increases. The increase in fronthaul load can result in data loss, delay and/or communication links going down. In addition, the larger the amount of data transferred over the fronthaul interface 108, the higher is the computational complexity of the signal processing (e.g., multi user detection) at the central processing circuitry. These drawbacks hinder the reliability of large scale distributed antenna systems.

Systems, devices and methods described herein allow for reliable and scalable uplink signal detection schemes for distributed antenna systems (e.g., cell free massive MIMO communications). Access points 104 in distributed antenna systems can include local processing circuitries configured to process and filter data received from the UEs, and transmit filtered or reduced data to the central processing circuitry 106. Considering the degree of redundancy in the data received by each access point 104 can be relatively high, e.g., based the total number of antennas 110 N per access point 104, the local processing circuitry in each access point 104 can reduce the amount of data to be transferred to the central processing circuitry 106 without negatively affecting the reliability and accuracy of multi user detection at the central processing circuitry. The reduction in the amount of data transferred to the central processing circuitry 106 can be based on the estimation and analysis of channel characteristics or properties (e.g., channel coefficients) of the various communication channels associated with the antennas 110 of the access point 104. Specifically, some communication channels may have relatively low channel gain compared to other communication channels. As such, transferring data received over low-gain communication channels to the central processing circuitry 106 may be mitigated given the redundancy in the data received over different communication channels. This approach reduces both the load over the fronthaul interface 108 as well as the computational complexity of multi-user detection at the central processing circuitry 106, and increases the reliability of relatively large scale distributed antenna systems.

According to example embodiments, a communication system, or a distributed antenna system, can include a plurality of access points each of which having a plurality of antennas and a local processing circuitry (or local processing unit), and a central processing circuitry connected to the plurality of access points via a fronthaul interface. The central processing circuitry can process data, received by various antennas of various access points from a plurality of user equipments (UEs), to perform multi-user detection (MUD) and detect separate signals transmitted by separate UEs. To reduce the amount of data transferred to and processed by the central processing circuitry, the local processing circuitry of each access point can estimate channel characteristics or properties (e.g., channel coefficients) of various communication channels between the UEs and antennas of the access point, and determine a subset of the UEs based on the estimated channel characteristics. The local processing circuitry can generate a processed version of the data received by the antennas of the corresponding access point based on the determined subset of UEs, and transmit the processed version of the data to the central processing circuitry. The central processing circuitry can detect, for each UE, a signal transmitted by the UE using data received from local processing circuitries of the plurality of access points.

Figure 2:
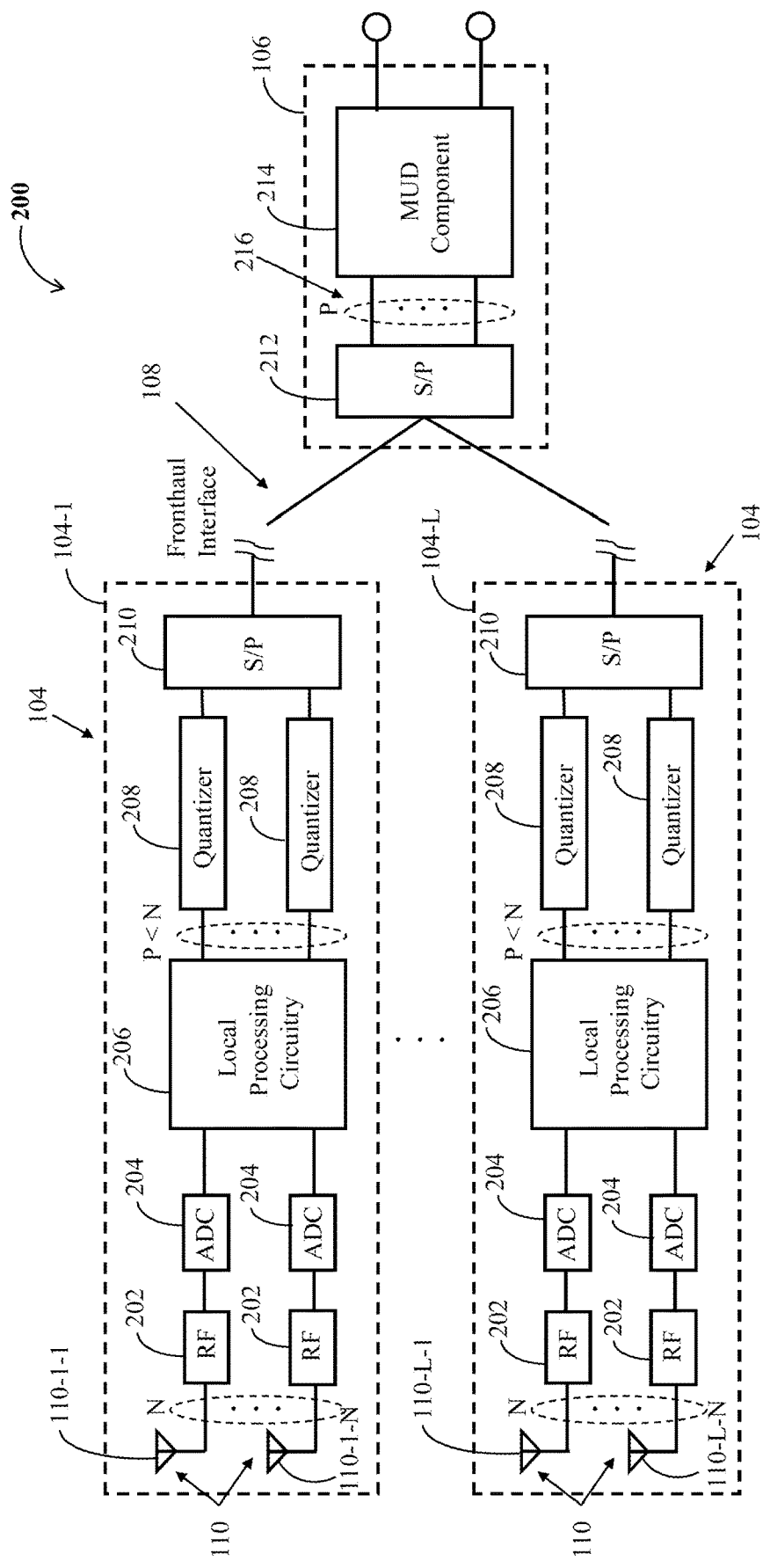
FIG. 2 shows a block diagram of a distributed antenna communication system, according to present embodiments.

Referring now to FIG. 2, a block diagram of a distributed antenna communication system 200 is shown, according to example embodiments. In brief overview, the distributed antenna communication system 200 can include a plurality of access points 104 and a central processing circuitry 106 connected to the plurality of access points 104 via the fronthaul interface 108. Each access point 104 can include a plurality of antennas 110, radio frequency (RF) circuits 202, analog to digital converters (ADC) 204, a local processing circuitry 206, quantization components or modules 208 (also referred to as quantizer(s) 208) and a parallel-to-serial multiplexer 210. The central processing circuitry 106 can include a serial-to-parallel demultiplexer 212 and a multi-user detection component 214.

In each access point 104, each antenna 110 can be connected to a corresponding RF circuit 202. The RF circuit 202 can demodulate signals received by the antenna 110 to generate corresponding baseband signals. The RF circuit 202 can be connected to a corresponding ADC 204. The ADC 204 can transform the baseband signal output by the RF circuit 202 into one or more discrete symbols. Each RF circuit— ADC pair can be viewed as forming a data path from the corresponding antenna 110 to the local processing circuitry 206. In other words, digital symbols representing signals received by the antennas 110 are fed as input to the local processing circuitry 206 via parallel data paths associated with separate antennas 110.

The local processing circuitry 206 can include any combination of one or more microprocessors, one or more digital signal processors (DSPs), one or more field-programmable gate arrays (FPGAs), one or more multicore processors, one or more network processors, other programmable software devices, or one or more integrated circuits (ICs). The local processing circuitry 206 can include a memory (not shown in FIG. 2) to store computer code instructions executable by a processor of the local processing circuitry 206 and/or data received from the antennas 110. The memory can include cache memory, random access memory (RAM), read-only memory (ROM) or other types of memory devices. Assuming there are N antennas 110 (e.g., 110-1-1 to 110-1-N, where 1 is the access point index as discussed with regard to FIG. 1) in each access point 104, the local processing circuitry 206 can include N input ports each of which receiving data associated with a corresponding antenna 110.

The local processing circuitry 206 can estimate, for each communication channel (or wireless communication channel) between an antenna 110 of the access point 104 and a UE 102, channel characteristics of the communication channel. The channel characteristics can include the channel coefficient of each communication channel. Note that as used herein, a communication channel can refer to or can include the RF circuitry characteristics of both the transmitter and receiver as well as the propagation channel between the transmit antenna of the transmitter and receive antenna of the receiver. The local processing circuitry 206 can determine a subset of UEs of the plurality of UEs 102 using the estimated channel characteristics for communication channels associated with the corresponding access point (e.g., the communication channels between the plurality of antennas of the access point 104 and the plurality of UEs 102). The subset of UEs can include P UEs, where P is less than or equal to N; the number of antennas 110 in the access point 104. The local processing circuitry 206 can transmit data associated with the subset of UEs to the central processing circuitry 106.

Figure 3:
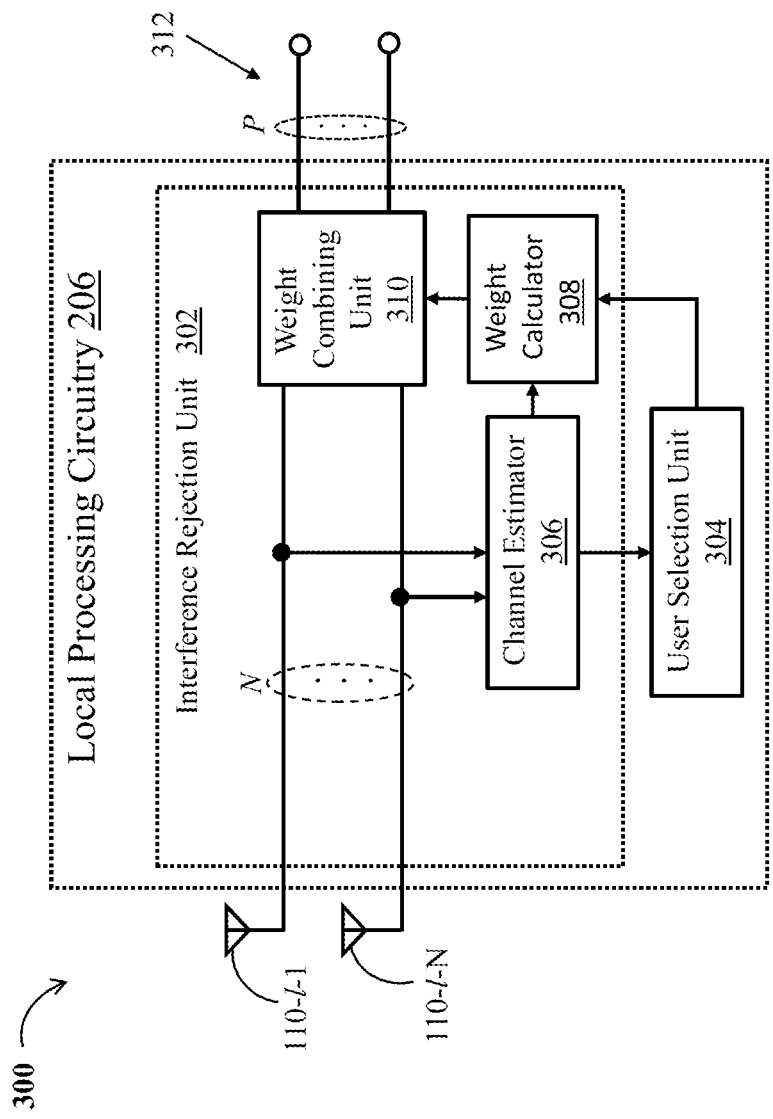
FIG. 3 illustrates a block diagram of an example access point, according to the present embodiments.

Referring now to FIG. 3, a block diagram of an example access point 300 is shown, according to example embodiments. The access point 300 can correspond to the access point 104-$l$ in FIGS. 1 and 2, where $l$ is an integer such that $1 \leq l \leq L$. The access point 300 can include N antennas 110-1 to 110-N, an interference rejection unit 302 and a UE selection unit 304. The interference rejection unit 302 and the UE selection unit 304 can be components or modules of the local processing circuitry 206. The interference rejection unit 302 can include a channel estimator 306, a weight calculator 308 and a weight combining unit 310. The interference rejection unit 302, the UE selection unit 304, the channel estimator 306, the weight calculator 308 and/or the weight combining unit 310 can be implemented as software modules, hardware components or a combination of software and hardware. For instance, interference rejection unit 302, the UE selection unit 304, the channel estimator 306, the weight calculator 308 and/or the weight combining unit 310 can be implemented as software executable by one or more processors of the local processing circuitry 206.

The channel estimator 306 can estimate channel characteristics for each of the communication channels between the antennas 110-$l$-1 to 110-$l$-N of the access point 300 and the UEs 102. There is a communication channel between each UE-antenna pair. Also, the total of the communication channels between the UEs 102 and the antennas 110-$l$-1 to 110-$l$-N of the access point 300 can be viewed as a MIMO channel having K inputs and N outputs. In estimating the channel characteristics or properties, the channel estimator can estimate the channel coefficient of each communication channel between each UE-antenna pair. Considering the MIMO channel, the channel coefficients can be described as an N×K channel matrix $H_l$. The estimate of the channel matrix $H_l$ determined by the channel estimator 306 is referred to herein as $\hat{H}_l$. The entry in the $n^{th}$ row and $k^{th}$ column of is referred to herein as $\hat{h}_{n,k}$ and represents the estimated channel coefficient of the communication channel between the $k^{th}$ UE and the $n^{th}$ antenna of the access point 300.

The channel estimator 306 can estimate $\hat{H}_l$ using channel estimation techniques known or to become known in the relevant art. For example, the channel estimator 306 can estimate channel properties using reference signals. An antenna 110-$l$-$n$ can transmit a predefined reference signal to a UE 102 and the UE 102 can estimate the channel coefficient of communication channel between the antenna 110-$l$-$n$ and the UE 102 and transmit the estimated channel coefficient to the access point 300. In some implementations, the UE 102 can transmit the predefined reference signal, which is received at each of the antennas 110-$l$-1 to 110-$l$-N of the access point 300. The channel estimator 306 can estimate the channel coefficients of the N communication channels between the UE 102 and the antennas 110-$l$-1 to 110-$l$-N based on the received signals at the antennas 110-$l$-1 to 110-$l$-N and the predefined reference signal. For example, for a given communication channel, the received version of the reference signal at a corresponding antenna can be equal to the reference signal multiplied by the channel coefficient.

The channel estimator 306 may further estimate the total channel noise for each of the antennas 110-$l$-1 to 110-$l$-N or a noise vector $n_l$ for the access point 300. The estimate of the noise vector $n_l$ is referred to herein as $\hat{n}_l$. Both $n_l$ and $\hat{n}_l$ can be N×1 vectors with each entry representing the noise (or the estimate thereof) at a corresponding antenna of the antennas 110-$l$-1 to 110-$l$-N of the access point 300.

The UE selection unit 304 can determine a subset of the UEs 102 using the estimated channel properties or the estimated channel matrix $\hat{H}_l$. For example, the UE selection unit 304 can select P UEs having the P highest total channel gains, where P is an integer less than or equal to N. In some implementations, P is smaller than K. For the communication channel between the $k^{th}$ UE and the $n^{th}$ antenna of the access point 300, the channel estimator can determine (or compute) the corresponding channel gain as $|\hat{h}_{n,k}|^2$. For the $k^{th}$ UE, the UE selection unit 304 can determine (or compute) the corresponding total channel gain as:

$$G_l^{(k)} = \sum_{n=1}^{N} |\hat{h}_{n,k}|^2. \quad (1)$$

That is, the UE selection unit 304 can sum up the channel gains for the communication channels between the $k^{th}$ UE and each of the antennas 110-$l$-1 to 110-$l$-N. The UE selection unit 304 can select the P UEs associated with the P highest total channel gains $G_l^{(k)}$. Note that the index $l$ refers to the $l^{th}$ access point 300. In some implementations, the UE selection unit 304 can determine the P UEs according to a different approach (e.g., instead of those having the P highest total channel gains).

Referring now to FIGS. 2 and 3, the UE selection unit 304 may be implemented in the central processing circuitry 106 according to some implementations. The local processing circuitry 206 (or the channel estimator 306) of the access point 300 can transmit the estimated channel properties or the estimated channel matrix $\hat{H}_l$ to the central processing circuitry 106. The UE selection unit 304 of the central processing circuitry 106 can determine, identify or select, for each access point 300 or 104, a corresponding subset of UEs (e.g., including P UEs where 1≤P<N) using the channel properties of the communication channels between the plurality of UE 102 and the plurality of antennas 110 of the access point 300 or 104. For example, the UE selection unit 304 of the central processing circuitry 106 can select, for each access point 300 or 104, the P UEs having the highest total channel gains $G_l^{(k)}$ subject to the constraint that each UE 102 is selected in at least one access point 300 or 104. This constraint guarantees that no UE 102 is left unselected in all access points. The central processing circuitry 106 can transmit, and the local processing circuitry 206 of the access point 300 can receive, an indication of the subset of the plurality of UEs selected or determined for the access point 300. In some implementations, P is smaller than K.

The weight calculator 308 can determine or compute a weighting matrix for weighting (and reducing the amount of) data to be sent to the central processing circuitry 106. The weight calculator 308 can determine a covariance matrix of signals received at the plurality of antennas 110-$l$-1 to 110-$l$-N of the access point 300. Given the signal vector ri received by the access point 300 or the corresponding antennas 110-$l$-1 to 110-$l$-N, the weight calculator 308 can compute or calculate an N×N covariance matrix $R_l$ of the signal vector $r_l$ (associated with the access point 300) as:

$$R_l = E[r_l r_l^H] \quad (2)$$

The superscript H refers to the Hermitian transpose (or conjugate transpose) of the signal vector $r_l$. The weight calculator 308 can also compute the inverse $R_l^{-1}$ of the covariance matrix $R_l$.

The weight calculator 308 can determine a weighting matrix $U_l$ of minimum mean square error-interference rejection combining (MMSE-IRC) for the access point 300, using the covariance matrix and channel properties of communication channels associated with the subset of UEs. The weight calculator 308 can determine a channel submatrix $\hat{H}_l^{(D)}$ by using (or extracting) only column vectors of the estimated channel matrix $\hat{H}_l$ that are associated with the subset of UEs. In other words, starting from the estimated channel matrix $\hat{H}_l$ the weight calculator 308 can delete or eliminate column vectors that are not associated with the selected subset of UEs (or associated with non-selected UEs) and maintain only column vectors associated with the selected subset of UEs to construct or determine the channel submatrix $\hat{H}_l^{(D)}$. Note that the channel submatrix $\hat{H}_l^{(D)}$ is an N×P matrix (not an N×K matrix). The weight calculator 308 can compute or determine the weighting matrix of MMSE-IRC $U_l$ for the access point 300 as:

$$U_l = \hat{H}_l^{(D)H} R_l^{-1}. \quad (3)$$

Note that the superscript H in $\hat{H}_l^{(D)H}$ is indicative of the Hermitian transpose of the channel submatrix $\hat{H}_l^{(D)}$. The matrix $\hat{H}_l^{(D)H}$ is a P×N matrix and the matrix $R_l^{-1}$ is an N×N matrix. Therefore, the weighting matrix of MMSE-IRC $U_l$ is a P×N matrix.

The weight combining unit 310 can use the weighting matrix of MMSE-IRC $U_l$ determined by the weight calculator 308 to weight data to be transmitted to the central processing circuitry 106. For example, the weight combining unit 310 can compute or determine a weighted signal vector $r_l^w$ as a product vector representing a product of the weighting matrix $U_l$ and the vector of receive signals $r_l$ received at the plurality of antennas 110-*l*-1 to 110-*l*-N of the access point 300. That is:

$$r_l^w = U_l r_l. \quad (4)$$

The weight combining unit 310 can compute or determine a weighted estimate of the channel matrix $\hat{H}_l^w$ as a product matrix representing a product of the weighting matrix $U_l$ and the estimated channel matrix $\hat{H}_l$ representing channel characteristics or properties (e.g., channel coefficients) of communication channels between the plurality of UEs 102 and the plurality of antennas 110-*l*-1 to 110-*l*-N. That is:

$$\hat{H}_l^w = U_l \hat{H}_l. \quad (5)$$

The weight combining unit 310 can compute or determine a weighted noise vector $\hat{n}_l^w$ as a product of the weighting matrix $U_l$ and the estimated noise vector $\hat{n}_l$, such that $$\hat{n}_l^w = U_l \hat{n}_l \quad (6)$$

It is to be noted that the weighted signal vector $r_l^w$ has a dimension of P×1 whereas the original signal vector $r_l$ has a dimension of N×1. Given that P is less than or equal to N, the length of $r_l^w$ is less than or equal to the length of $r_l$. The same is true for the weighted noise vector estimate $\hat{n}_l^w$ (having a dimension P×1) compared to the estimated noise vector $\hat{n}_l$ (having a dimension N×1). Also, while the dimension of the estimated channel matrix $\hat{H}_l$ is N×K, the dimension of the weighted channel matrix estimate $\hat{H}_l^w$ is P×K. Given that P is less than N, the weighted channel matrix estimate $\hat{H}_l^w$ has less rows than the estimated channel matrix $\hat{H}_l$.

The weight combining unit 310 or the local processing circuitry 206 can transmit the weighted signal vector $r_l^w$, the weighted channel matrix estimate $\hat{H}_l^w$ and/or the weighted noise vector estimate $\hat{n}_l^w$ to the central processing circuitry 106. Transmitting the weighted signal vector $r_l^w$, the weighted channel matrix estimate $\hat{H}_l^w$ and/or the weighted noise vector estimate $\hat{n}_l^w$ instead of transmitting the signal vector $r_l$, the estimated channel matrix $\hat{H}_l$ and/or the estimated noise vector $\hat{n}_l$ leads to reduction in the amount of data transmitted over the fronthaul interface 108. The smaller is P compared to N and/or K, the more significant is the reduction in the amount data transferred over the fronthaul interface 108. In some implementations, the weight combining unit 310 or the local processing circuitry 206 can transmit the matrix $U_l$, the matrix $R_l$, the correlation matrix $E\{\hat{H}_l \hat{H}_l^H\}$ and/or some other measure of the interference subspace to the central processing unit 106. The weight combining unit 310 or the local processing circuitry 206 can compute or determine the expectation in $E\{\hat{H}_l \hat{H}_l^H\}$ over small scale fading. The access point 104 may decide to sacrifice capacity for the P (e.g., coarser quantization as discussed herein) desired signals, by applying relatively coarse quantization (as discussed in further detail below, e.g., with regard to FIGS. 4 and 5) to allow for the transmission of information indicative of the interference situation.

The weight combining unit 310 or the local processing circuitry 206 may have P output ports 312. The weight combining unit 310 or the local processing circuitry 206 can output different entries of the weighted signal vector $r_l^w$ and/or the weighted noise vector estimate $\hat{n}_l^w$ over separate output ports. The weight combining unit 310 or the local processing circuitry 206 can output separate rows of the weighted channel matrix estimate $\hat{H}_l^w$ over separate output rows. For example, the weight combining unit 310 or the local processing circuitry 206 can output the $p^{th}$ row of the weighted channel matrix estimate $\hat{H}_l^w$ (or the $p^{th}$ entry of the weighted signal vector $r_l^w$ or $p^{th}$ entry of the weighted noise vector estimate $\hat{n}_l^w$) over the $p^{th}$ output port among the P output ports. The output ports can be physical output ports or logical output ports.

Referring back to FIG. 2, the serial-to-parallel multiplexer 210 can multiplex or interleave the data output over the P output ports to form corresponding serial data. On the other end of the fronthaul interface 108, the parallel-to-serial demultiplexer 212 can de-multiplex the serial data transferred over the fronthaul interface 108 into P parallel data channels 216. In some implementations, the serial-to-parallel multiplexer 210 and/or the parallel-to-serial demultiplexer 212 can be integrated in the fronthaul interface 108 instead of the serial-to-parallel multiplexer 210 being part of the access point 104 and/or the parallel-to-serial demultiplexer 212 being part of the central processing circuitry 106.

The multi-user detection (MUD) component 214 of the central processing circuitry 106 can be a software component, a hardware component or a combination of software and hardware components. For example, the MUD component 214 can be implemented as computer code instructions that are executed by one or more hardware processors of the central processing circuitry 106. The MUD component 214 can be configured or designed to estimate separate signals transmitted by separate UEs 102 using the data received from the access points 104-1 to 104-L. The MUD component 214 can estimate separate signals transmitted by separate UEs 102 by employing maximum ratio combining, zero-forcing detection, minimum mean square error (MMSE) detection, maximum likelihood detection, successive interference cancellation, or sphere decoding for multi user detection, among other detection methods.

The MUD component 214 or the central processing circuitry 106 can construct the weighted signal vector $r_l^w$, the weighted channel matrix estimate $\hat{H}_l^w$ and/or the weighted noise vector estimate $\hat{n}_l^w$ using data received from the access point 104-*l*. Specifically, the MUD component 214 or the central processing circuitry 106 can use the data received from the access point 104-*l* over the P channels 216 to reconstruct the weighted signal vector $r_l^w$, the weighted channel matrix estimate $\hat{H}l^w$ and/or the weighted noise vector estimate $\hat{n}_l^w$ The MUD component 214 or the central processing circuitry 106 can construct an LP×K equivalent channel matrix $H^{(E)}$ as:

$$H^{(E)} = \begin{bmatrix} \hat{H}_1^w \\ \hat{H}_2^w \\ \vdots \\ \hat{H}_L^w \end{bmatrix} = \begin{bmatrix} U_1 \hat{H}_1 \\ U_2 \hat{H}_2 \\ \vdots \\ U_L \hat{H}_L \end{bmatrix}. \quad (7)$$

The MUD component 214 or the central processing circuitry 106 can construct an LP×1 full weighted receive signal vector $\tilde{r}$ combining weighted signal vectors $r_l^w$ for all access points 104-1 to 104-L. The MUD component 214 or the central processing circuitry 106 can construct the full receive signal vector $\tilde{r}$ as:

$$\tilde{r} = \begin{bmatrix} r_1^w \\ r_2^w \\ \vdots \\ r_L^w \end{bmatrix} = \begin{bmatrix} U_1 r_1 \\ U_2 r_2 \\ \vdots \\ U_L r_L \end{bmatrix}. \quad (8)$$

In a similar way, the MUD component 214 or the central processing circuitry 106 can construct a full weighted noise vector ñ as:

$$\tilde{n} = \begin{bmatrix} \hat{n}_1^w \\ \hat{n}_2^w \\ \vdots \\ \hat{n}_L^w \end{bmatrix} = \begin{bmatrix} U_1 \hat{n}_1 \\ U_2 \hat{n}_2 \\ \vdots \\ U_L \hat{n}_L \end{bmatrix}. \quad (9)$$

Let the estimated transmit signal vector ŝ represent estimates of the signals transmitted by the plurality of UEs 102. The full receive signal vector r̃ can be described as:

$$\tilde{r} = H^{(E)} \hat{s} + \tilde{n} \quad (10)$$

When applying zero-forcing detection, the MUD component 214 can determine or compute a zero-forcing detection matrix as:

$$W^{ZF} = (H^{(E)H} H^{(E)})^{-1} H^{(E)H} \quad (11)$$

Using the zero-forcing detection matrix $W^{ZF}$, the MUD component 214 can determine estimated transmit signal vector ŝ as:

$$\hat{s} = W^{ZF} \tilde{r}. \quad (12)$$

The MUD component 214 or the central processing circuitry 106 can output the estimated transmit signal vector ŝ to other network element or device (not shown in FIG. 2).

The estimation of the transmit signal vector ŝ as described in equation (12) allows for the elimination or mitigation of the effect of the interference on the estimated transmit signal vector ŝ. In general, the weighting matrix $U_l$ as defined in equation (3) allows for reducing the effect of interference when used in estimating the transmit signals.

In some implementations, each local processing circuitry 206 can determine or compute residual interference information and transmit the residual interference information to the central processing circuitry 106. According to a first approach, the local processing circuitry 206 for the AP 104_1 can compute the respective signal power and the respective interference power. The local processing circuitry 206 can compute the respective signal power for each selected user as:

$$P_{l,p}^{(S)} = |\hat{h}_{l,k_p}^w|^2 \quad (13)$$

where the integers p and $k_p$ represent indices of the output ports and corresponding selected UEs. The local processing circuitry 206 can compute the respective interference power as:

$$P_{l,p}^{(I)} = \sum_{k \neq k_p}^{K} |\hat{h}_{l,k}^w|^2. \quad (14)$$

The vectors $\hat{h}_{l,k}^w$ represent the columns of the weighted estimate of the channel matrix $\hat{H}_l^w$ described in equation (5).

The local processing circuitry 206 can further compute the signal-to-interference ratio (SIR) (or signal-to-noise-and-interference ratio (SNIR)) for the $l^{th}$ AP 104_1 as:

$$\gamma_{l,p} = \frac{P_{l,p}^{(S)}}{P_{l,p}^{(I)}}. \quad (15)$$

In some implementations, the local processing circuitry 206 can transmit the SIR $\gamma_{l,p}$ as the residual interference information to the central processing circuitry 106. In some implementations, the local processing circuitry 206 can transmit the respective signal power $P_{l,p}^{(S)}$ and the respective interference power $P_{l,p}^{(I)}$ as the residual interference information to the central processing circuitry 106. The central processing circuitry 106 can compute the SIR $\gamma_{l,p}$ according to equation (15).

According to a second approach, the local processing circuitry 206 can compute a respective covariance matrix of interference and noise as:

$$R_l^{(IN)} = R_l - H_l^{(D)H} H_l^{(D)}, \quad (16)$$

or as:

$$R_l^{(IN)} = R_l E[H_l^{(D)H} H_l^{(D)}] \quad (17)$$

where $E[H_l^{(D)H} H_l^{(D)}]$ represents the expectation over relatively small scale fading. The local processing circuitry 206 can compute respective residual interference information as the product $U_l R_l^{(IN)}$. The local processing circuitry 206 can transmit, to the central processing circuitry 106, either the product $U_l R_l^{(IN)}$ or both $U_l$ and $R_l^{(IN)}$ as indicative of the respective residual interference information. In the latter case, the central processing circuitry can compute the product $U_l R_l^{(IN)}$.

The central processing circuitry 106 or the MUD component 214 can use the residual interference information in determining the estimated transmit signal vector ŝ. For instance, the central processing circuitry 106 or the MUD component 214 can use the residual interference information to reduce the complexity of equation (10). Specifically, the central processing circuitry 106 or the MUD component 214 can remove the elements or rows corresponding to APs associated with relatively low SIR (or SINR) in the equivalent channel matrix $H^{(E)}$, the full receive signal vector r̃ and the full weighted noise vector ñ For instance, the central processing circuitry 106 or the MUD component 214 can remove data (or rows) in equations (7)-(9) associated with one or more APs based on a SIR threshold. The central processing circuitry 106 or the MUD component 214 can remove data (or rows) in equations (7)-(9) associated with a fixed number of APs with lowest SIRs.

In some implementations, the central processing circuitry 106 or the MUD component 214 can use the residual interference information for weighting data corresponding the APs in the equivalent channel matrix $H^{(E)}$ and the full weighted noise vector ñ based on the SIRs or SINRs of different APs to improve estimation of the transmit signals. For instance, equation (10) for the equivalent received signal model can be rewritten as:

$$W^{(P)} \tilde{r} = W^{(P)} H^{(E)} \hat{s} + W^{(P)} \tilde{n} \quad (18)$$

Where $W^{(P)}$ is a weighting matrix. The central processing circuitry 106 or the MUD component 214 can determine or compute the weighting matrix $W^{(P)}$ as:

$$W^{(P)} = \begin{bmatrix} \alpha_{1,1} & \cdots & \alpha_{1,P} & \cdots & 0 & \cdots & 0 \\ 0 & \cdots & 0 & \ddots & 0 & \cdots & 0 \\ 0 & \cdots & 0 & \cdots & \alpha_{L,1} & \cdots & \alpha_{L,P} \end{bmatrix}. \quad (19)$$

The central processing circuitry 106 or the MUD component 214 can determine or compute the entry or element at (l, (l−1)P+p) of the matrix $W^{(P)}$ as $a_{l,p}$, where:

$$\alpha_{l,p} = \frac{\sqrt{LP\gamma_{l,p}}}{\sqrt{\sum_{l=1}^{L}\sum_{p=1}^{P}\gamma_{l,p}}}. \quad (20)$$

The parameter $\gamma_{l,p}$ represents the SIR or SNIR as described in equation (15). The central processing circuitry 106 or the MUD component 214 can then solve for the transmit signals based on equation (18).

In some implementations, the local processing circuitry 206 of an AP 104_1 can transmit, to the other access points 104, an indication of the subset of UEs selected by the AP 104_1 and/or related information such as weighting matrix of $U_l$, the estimated channel matrix $\hat{H}_l$, the signal vector $r_l$, the estimated noise vector $\tilde{n}_l$, the weighted signal vector $r_l^w$, the weighted noise vector estimate $\hat{n}_l^w$, the weighted channel matrix estimate $\hat{H}_l^w$ or a combination thereof. The AP 104_1 can receive, form one or more other APs 104, indications of one or more other subsets of the UEs selected by the one or more other APs and/or related data such corresponding weighting matrices, corresponding estimated channel matrices, corresponding receive signal vectors, corresponding estimated noise vector, corresponding weighted signal vectors, corresponding weighted noise vectors, corresponding weighted channel matrices or a combination thereof. In other words, instead of transmitting such information to the central processing circuitry 106, the APs 104 can exchange the information between them. As such, the APs 104 (or one AP) can determine or compute the corresponding transmit signals.

Figure 4:
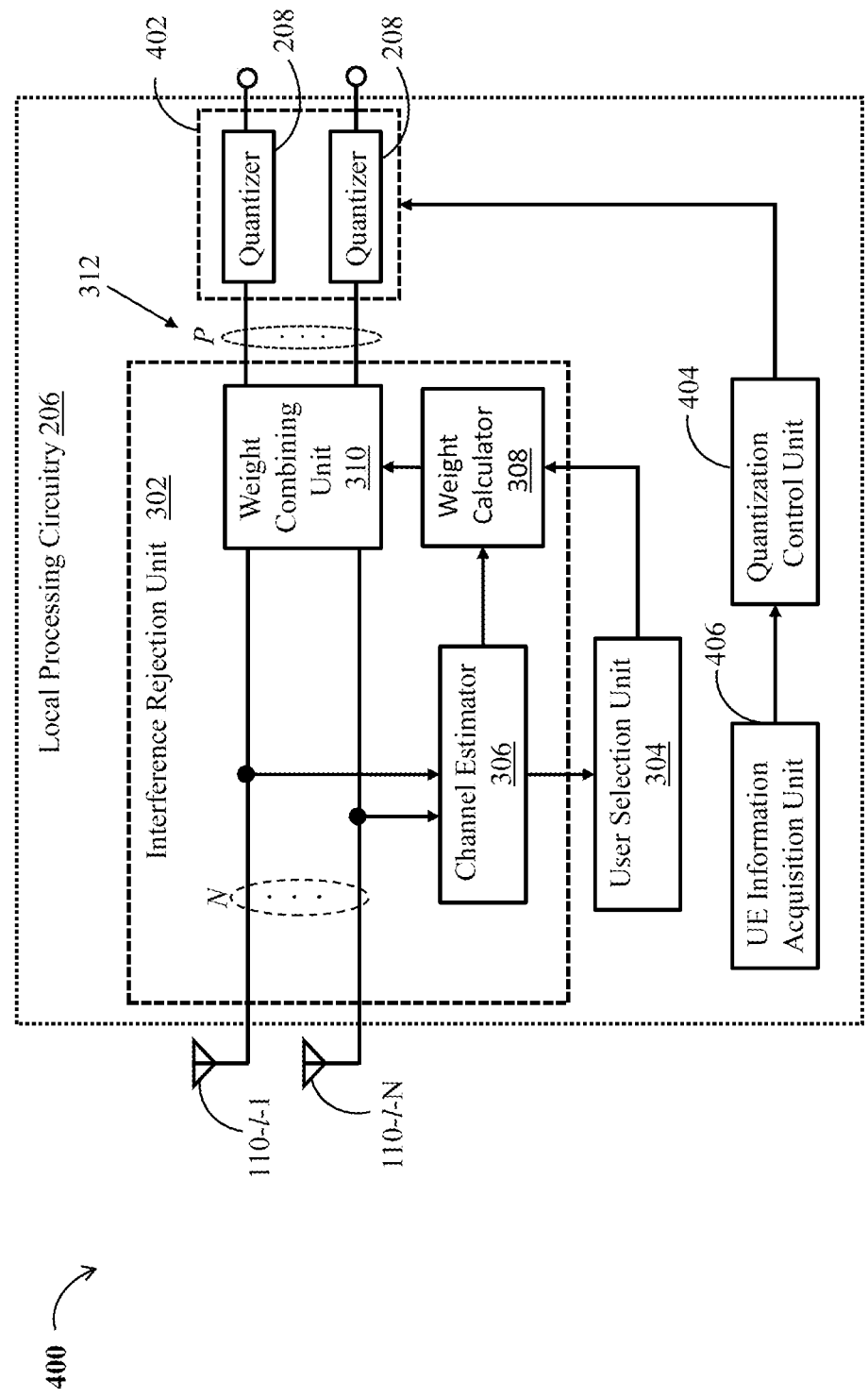
FIG. 4 illustrates a block diagram of another example access point, according to the present embodiments.

Referring now to FIG. 4, a block diagram of another example access point 400 is shown, according to example embodiments. Similar to the access point 300, the access point 400 can correspond to the access point 104-*l* in FIG. 2, where l is an integer such that 1≤l≤L. Compared to the access point 300, the access point 400 can further include a quantization component 402, a quantization control unit 404 and a UE information acquisition unit 406. The quantization component 402 can include P quantizers 208 each of which associated with a corresponding output port 312 of the P output ports 312.

The UE information acquisition unit 406 can acquire the modulation coding scheme (MCS) and/or channel state information for each of the UEs of the subset of selected UEs. The UE information acquisition unit 406 may query the UEs for the MCS and/or channel state information. In some implementations, the UE information acquisition unit 406 may query all UEs 102 for the UEs for the MCS and/or channel state information, e.g., prior to determination of the subset of UEs.

The quantization control unit 404 can determine, for each UE 102 of the subset of UEs, a number of quantization bits for quantizing data associated with the UE based on the MCS and/or channel state information and/or interference situation employed by the wireless communication device. For example, the quantization control unit 404 can determine for each of the quantizers 208 a corresponding number of quantization bits for quantizing data output by a corresponding output port 312 of the weight combining unit 310. The quantization control unit 404 can determine the number of quantization bits for each of the quantizers 208 using a look-up-table (LUT). Table 1 below provides an example LUT for use by the quantization control unit 404 to determine the number of quantization bits for each of the quantizers 208. The LUT of Table 1 maps different MCS indices to corresponding numbers of quantization bits to be used by the quantizers 208. The quantization control unit 404 can cause each of the quantizers 208 to operate (e.g., quantize data) according to the determined number of quantization bits.

TABLE 1

| MCS | Number of quantization bits |
|---|---|
| 0–4 (QPSK) | b1 (ex. 10bits/S) |
| 5–10 (16QAM) | b2 (ex. 12 bits/S) |
| 11–19 (64QAM) | b3 (ex. 16 bits/S) |
| 20–28 (256 QAM) | b4 (ex. 24bits/S) |

Figure 5:
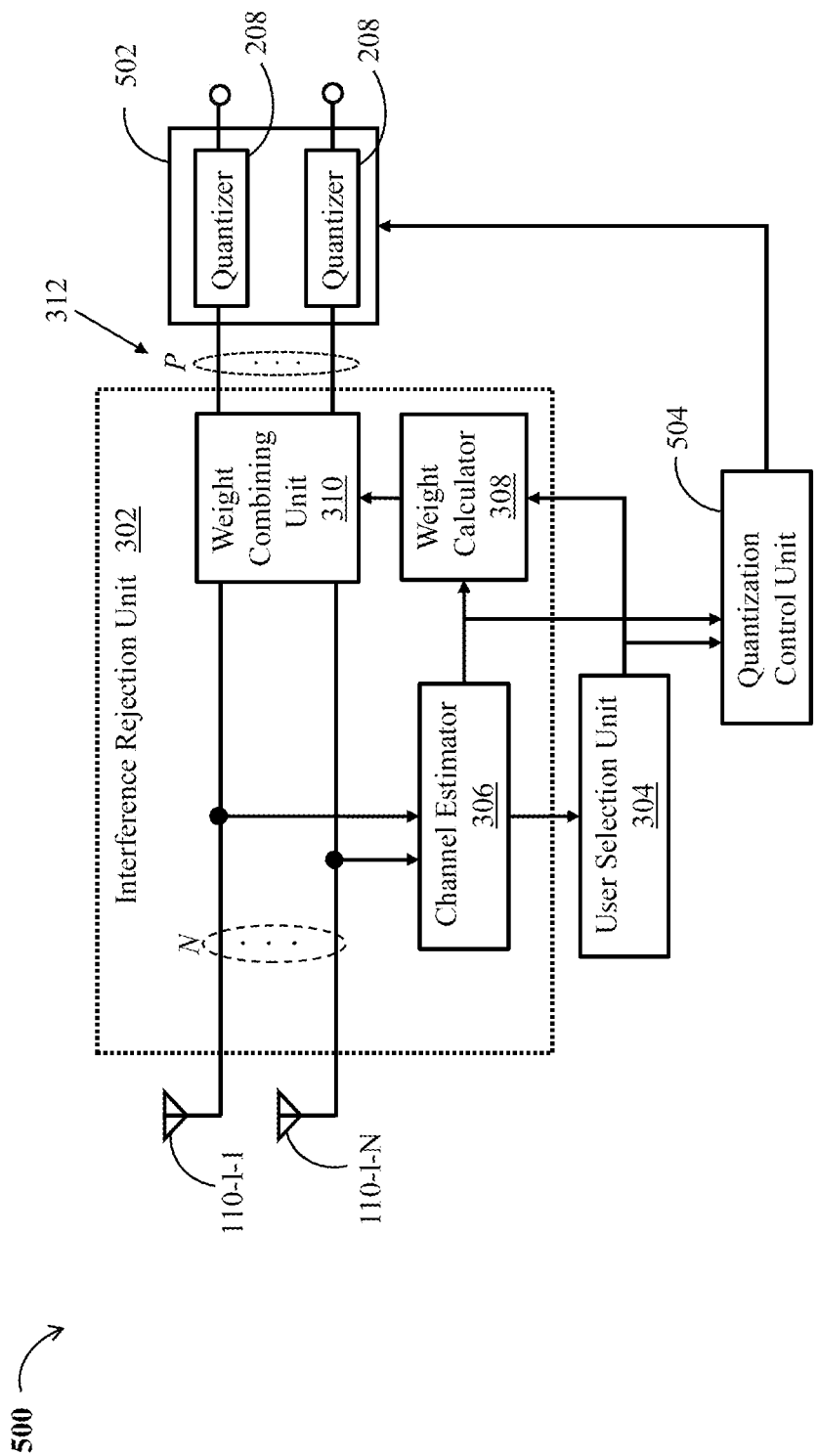
FIG. 5 illustrates a block diagram of yet another example access point, according to the present embodiments.

Referring now to FIG. 5, a block diagram of yet another example access point 500 is shown, according to example embodiments. Similar to the access point 300, the access point 500 can correspond to the access point 104-*l* in FIG. 2, where l is an integer such that 1≤l≤L. Compared to the access point 300, the access point 500 can further include a quantization component 502 and a quantization control unit 504. The quantization component 502 is similar to the quantization component 402 of FIG. 4. However, the quantization control unit 504 operates differently compared to the quantization control unit 404 of FIG. 4. Specifically, the quantization control unit 504 can be configured to determine the number of quantization bits for each quantizer 208 (or for quantizing data associated with each UE of the subset of UEs) using post signal-to-interference ratio (SIR).

The quantization control unit 504 can determine, for each UE 102 of the subset of UEs, a post signal-to-interference ratio (SIR) for the UEs 102. The quantization control unit 504 can determine the post SIRs using channel characteristics or properties of the plurality of communication channels. Specifically, the quantization control unit 504 can determine or compute the post SIR using entries of the weighted estimate of the channel matrix $\hat{H}_l^w$ or the product $U_l\hat{H}_l$ of the weighting matrix and the estimated channel matrix) for the access point 500. The quantization control unit 504 can determine or compute the post SIR as:

$$\gamma_{l,p} = \frac{|\hat{h}_{l,p,k_p}|^2}{\sum_{k \neq k_p}^{K} |\hat{h}_{l,p,k}|^2}. \quad (21)$$

In equation (21), $k_p$ represents an index of the UE assigned to the $p^{th}$ output port among the output ports 312 of the weight combining unit 310. The quantization control unit 504 can determine the number of quantization bits for quantizing data associated with the UE having index $k_p$ based on the post SIR $\gamma_{l,p}$ determined for that UE. For example, the quantization control unit 504 can use a LUT, e.g., as shown in Table 2 blow, to map post SIR values to corresponding number of quantization bits. As shown in Table 2, each range of post SIR can be mapped to a corresponding number of quantization bits. The quantization control unit 504 can cause each quantizer 208 to operate according to the number of quantization bits determined based on the post SIR for the corresponding UE (e.g., according to the mapping in Table 2). In some implementations, the quantization control unit 504 can cause each quantizer 208 determine the number of quantization bits based on the post SIR $\gamma_{l,p}$ for the corresponding UE as defined in equation (15) instead of equation (21).

TABLE 2

| SIR [dB] | Number of quantization bits |
|---|---|
| ~0 | b1 (ex. 10bits/S) |
| 0~10 | b2 (ex. 12 bits/S) |
| 10~20 | b3 (ex. 16 bits/S) |
| 20~ | b4 (ex. 24bits/S) |

Figure 6:
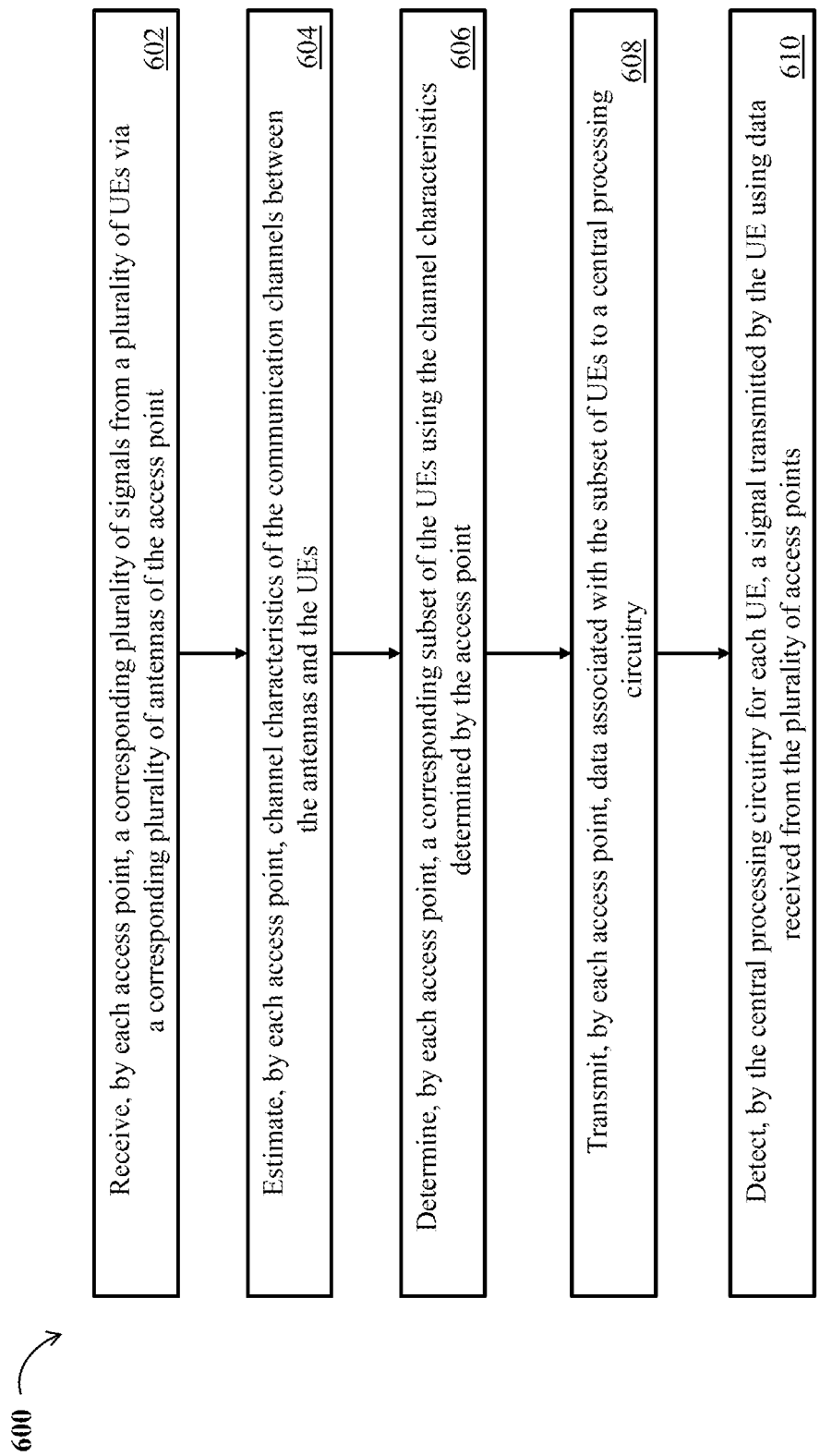
FIG. 6 shows a flowchart illustrating a method of multiuser detection in distributed antenna systems, according to the present embodiments.

Referring now to FIG. 6, a flowchart illustrating a method 600 of multiuser detection in distributed antenna systems is shown, according to example embodiments. The method 600 can include receiving, by each access point, a corresponding plurality of signals from a plurality of UEs via a corresponding plurality of antennas of the access point (STEP 602). The method 600 can include estimating, by each access point, channel characteristics of the communication channels between the antennas and the UEs (STEP 604). The method 600 can include determining, by each access point, a corresponding subset of the UEs using the channel characteristics determined by the access point (STEP 606). The method 600 can include each access point transmitting, data associated with the subset of UEs to a central processing circuitry connected to the plurality of access points via a fronthaul interface (STEP 608). The method 600 can include the central processing circuitry detecting for each UE a signal transmitted by the UE, using data received from the plurality of access points (STEP 610).

The method 600 can be implemented as discussed above with regard to FIGS. 2-5. The method 600 may be implemented as computer code instructions that are executed by hardware processors of the local processing circuitries 206 of the access points 104 and the central processing circuitry 106. In some implementations, the method 600 can be implemented using software, hardware or a combination of both hardware and software.

In some implementations, a computer-readable medium can include computer code instructions stored thereon. The computer code instructions, when executed by one or more processors, can cause the one or more processors to perform the method 600 as described in FIGS. 2-6.

Although the present embodiments have been particularly described with reference to preferred ones thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A communication system comprising:
   a central processing circuitry; and
   a plurality of access points connected to the central processing circuitry via a fronthaul interface, each access point of the plurality of access points including:
      a plurality of antennas configured to receive signals from a plurality of wireless communication devices; and
      a local processing circuitry connected to the plurality of antennas and configured to:
         estimate, for each communication channel between an antenna of the plurality of antennas and a wireless communication device of the plurality of wireless communication devices, channel characteristics of the communication channel;
         determine a subset of the plurality of wireless communication devices using channel characteristics for communication channels between the plurality of wireless communication devices and the plurality of antennas, the subset including a number of wireless communication devices less than or equal to the number of antennas of the plurality of antennas; and
         transmit, to the central processing circuitry, data associated with the subset of wireless communication devices; and
   the central processing circuitry configured to detect, for each wireless communication device of the plurality of wireless communication devices, a signal transmitted by the wireless communication device using data received from local processing circuitries of the plurality of access points.

2. The communication system of claim 1, wherein in determining the subset of the plurality of wireless communication devices the local processing circuitry is configured to:
   compute, for each wireless communication device of the plurality of wireless communication devices, a total channel gain of the wireless communication device using channel characteristics of communication channels associated with the wireless communication device; and
   identify the subset of the plurality of wireless communication devices as a number of wireless communication devices having highest total channel gains.

3. The communication system of claim 1, wherein in determining the subset of the plurality of wireless communication devices the local processing circuitry is configured to:
   transmit, to the central processing circuitry, channel characteristics of communication channels between the plurality of wireless communication devices and the plurality of antennas, the central processing circuitry configured to identify the subset of the plurality of wireless communication devices using the channel characteristics of the communication channels between the plurality of wireless communication devices and the plurality of antennas; and
   receive an indication of the subset of the plurality of wireless communication devices from the central processing circuitry.

4. The communication system of claim 1, wherein the subset of the plurality of wireless communication devices is a first subset, and wherein the local processing circuitry is further configured to:
   transmit, to the one or more other access points, an indication of the first subset of the plurality of wireless communication devices; and
   receive an indication of a second subset of the plurality of wireless communication devices from a second access point, the second subset of the plurality of wireless communication devices determined by the second access point.

5. The communication system of claim 1, wherein the local processing circuitry is further configured to:
   determine a covariance matrix of signals received at the plurality of antennas of the access point; and
   determine a weighting matrix for interference rejection combining for the access point, using the covariance matrix and channel characteristics of communication channels associated with the subset of wireless communication devices.

6. The communication system of claim 5, wherein the local processing circuitry is further configured to:
compute a product vector representing a product of the weighting matrix and a vector of signals received at the plurality of antennas of the access point;
compute a product matrix representing a product of the weighting matrix and a channel matrix representing channel characteristics of communication channels between the plurality of wireless communication devices and the plurality of antennas; and
transmit the product vector and the product matrix to the central processing circuitry.

7. The communication system of claim 6, wherein the local processing circuitry is further configured to transmit a remaining interference information after the product of the weighting matrix to the central processing circuitry.

8. The communication system of claim 5, wherein the central processing circuitry is configured to detect, for each wireless communication device of the plurality of wireless communication devices, the signal transmitted by the wireless communication device using product vectors and product matrices received from the plurality of access points.

9. The communication system of claim 1, wherein the central processing circuitry is configured to detect, for each wireless communication device of the plurality of wireless communication devices, the signal transmitted by the wireless communication device using at least one of:
zero-forcing detection;
minimum mean square error (MI SE) detection;
maximum ratio combining;
maximum likelihood detection;
successive interference cancellation; or
sphere decoding for multi user detection.

10. The communication system of claim 1, wherein the local processing circuitry is further configured to:
determine, for each wireless communication device of the subset of wireless communication devices, a modulation coding scheme (MCS) employed by the wireless communication device; and
determine, for each wireless communication device of the subset of wireless communication devices, a number of quantization bits for quantizing data associated with the wireless communication device based on the MCS employed by the wireless communication device.

11. The communication system of claim 1, wherein the local processing circuitry is further configured to:
determine, for each wireless communication device of the subset of wireless communication devices, channel realization and interference situation, using channel characteristics of the plurality of channels and signals received at the plurality of antennas of the access point; and
determine a number of quantization bits for quantizing data associated with the wireless communication device based on the channel realization and interference situation for the wireless communication device.

12. The communication system of claim 1, wherein the local processing circuitry is further configured to:
determine, for each wireless communication device of the subset of wireless communication devices, a post signal-to-interference ratio (SIR) for the wireless communication device, using channel characteristics of the plurality of channels and signals received at the plurality of antennas of the access point; and determine a number of quantization bits for quantizing data associated with the wireless communication device based on the post SIR for the wireless communication device.

13. The communication system of claim 1, wherein the channel characteristics for each communication channel include a channel coefficient.

14. A method comprising:
receiving, by each access point of a plurality of access points, a corresponding plurality of signals from a plurality of wireless communication devices via a corresponding plurality of antennas of the access point;
estimating, by each access point of the plurality of access points and for each communication channel between an antenna of the corresponding plurality of antennas and a wireless communication device of the plurality of wireless communication devices, channel characteristics of the communication channel;
determining, by each access point of the plurality of access points, a subset of the plurality of wireless communication devices using channel characteristics for communication channels between the plurality of wireless communication devices and the plurality of antennas, the subset including a number of wireless communication devices less than or equal to a number of antennas of the access point;
transmitting, by each access point of the plurality of access points to a central processing circuitry connected to the plurality of access points via a fronthaul interface, data associated with the subset of wireless communication devices; and
detecting, by the central processing circuitry, for each wireless communication device of the plurality of wireless communication devices, a signal transmitted by the wireless communication device using data received from the plurality of access points.

15. The method of claim 14, wherein determining the subset of the plurality of wireless communication devices includes:
computing, for each wireless communication device of the plurality of wireless communication devices, a total channel gain of the wireless communication device using channel characteristics of communication channels associated with the wireless communication device; and
identifying the subset of the plurality of wireless communication devices as a number of wireless communication devices having highest total channel gains.

16. The method of claim 14, wherein determining the subset of the corresponding plurality of wireless communication devices includes:
transmitting, to the central processing circuitry, channel characteristics of communication channels between the plurality of wireless communication devices and the corresponding plurality of antennas;
identifying, by the central processing circuitry, the subset of the plurality of wireless communication devices using channel characteristics received from the plurality of access points; and
receiving an indication of the subset of the plurality of wireless communication devices from the central processing circuitry.

17. The method of claim 14, wherein in determining the subset of the plurality of wireless communication devices a local processing circuitry is configured to:

transmit, to the other access points, an indication of the subset of the plurality of wireless communication devices; and receive an indication of the subset of the plurality of wireless communication devices from other access points.

18. The method of claim 14, further comprising:

determining, by each access point of the plurality of access points, a covariance matrix of signals received at the corresponding plurality of antennas; and determining, by each access point of the plurality of access points, a weighting matrix of minimum mean square error-interference rejection combining for the access point, using the covariance matrix and channel characteristics of communication channels associated with the subset of wireless communication devices.

19. The method of claim 18, further comprising:

computing, by each access point of the plurality of access points, a product vector representing a product of the weighting matrix and a vector of signals received at the corresponding plurality of antennas;

computing, by each access point of the plurality of access points, a product matrix representing a product of the weighting matrix and a channel matrix representing channel characteristics for the channel characteristics of communication channels between the plurality of wireless communication devices and the plurality of antennas; and transmitting, by each access point of the plurality of access points, the product vector and the product matrix to the central processing circuitry.

20. The method of claim 19, wherein a local processing circuitry is further configured to transmit a remaining interference information after the product of the weighting matrix to the central processing circuitry.

21. The method of claim 19, further comprising:

detecting, by the central processing circuitry, for each wireless communication device of the plurality of wireless communication devices, a signal transmitted by the wireless communication device using product vectors and product matrices received from the plurality of access points.

22. The method of claim 14, wherein detecting, for each wireless communication device of the plurality of wireless communication devices, the signal transmitted by the wireless communication device includes using at least one of:

zero-forcing detection;
minimum mean square error (MMSE) detection; or
maximum ratio combining
maximum likelihood detection;
successive interference cancellation; or
sphere decoding for multi user detection.

23. The method of claim 14, further comprising:

determining, for each wireless communication device of the subset of wireless communication devices, a modulation coding scheme (MCS) employed by the wireless communication device; and determining, for each wireless communication device of the subset of wireless communication devices, a number of quantization bits for quantizing data associated with the wireless communication device based on the MCS employed by the wireless communication device.

24. The method of claim 14, wherein a local processing circuitry is further configured to:

determine, for each wireless communication device of the subset of wireless communication devices, channel realization and interference situation using channel characteristics of the plurality of channels and signals received at the plurality of antennas of the access point; and determine a number of quantization bits for quantizing data associated with the wireless communication device based on the channel realization and interference situation for the wireless communication device.

25. The method of claim 14, further comprising:

determining, for each wireless communication device of the subset of wireless communication devices, a post signal-to-interference ratio (SIR) for the wireless communication device, using channel characteristics of the plurality of channels and signals received at the plurality of antennas of the access point; and determining a number of quantization bits for quantizing data associated with the wireless communication device based on the post SIR for the wireless communication device.

26. An access point device, comprising:

a plurality of antennas configured to receive signals from a plurality of wireless communication devices; and a local processing circuitry connected to the plurality of antennas and configured to:

estimate, for each communication channel between an antenna of the plurality of antennas and a wireless communication device of the plurality of wireless communication devices, channel characteristics of the communication channel;

determine a subset of the plurality of wireless communication devices using channel characteristics for communication channels between the plurality of wireless communication devices and the plurality of antennas, the subset including a number of wireless communication devices less than the number of antennas of the plurality of antennas; and transmit, to a central processing circuitry connected to the local processing circuitry via a fronthaul interface, data associated with the subset of wireless communication devices for use to detect signals transmitted by the plurality of wireless communication devices.

\* \* \* \* \*